United States Patent
Wang et al.

(10) Patent No.: US 9,585,090 B1
(45) Date of Patent: Feb. 28, 2017

(54) APPARATUS AND METHOD FOR OPTIMIZING PERFORMANCE OF A RADIO DEVICE

(71) Applicant: Google Technology Holdings LLC, Mountain View, CA (US)

(72) Inventors: Hui Wang, Beijing (CN); Krishna K. Bellamkonda, Lake Zurich, IL (US); Jing Ji, Gurnee, IL (US)

(73) Assignee: Google Technology Holdings LLC, Mountain View, CA (US)

(*) Notice: Subject to any disclaimer, the term of this patent is extended or adjusted under 35 U.S.C. 154(b) by 0 days.

(21) Appl. No.: 14/981,046

(22) Filed: Dec. 28, 2015

Related U.S. Application Data

(62) Division of application No. 14/319,111, filed on Jun. 30, 2014, now Pat. No. 9,332,491.

(51) Int. Cl.

| | |
|---|---|
| *H04W 4/00* | (2009.01) |
| *H04W 48/18* | (2009.01) |
| *H04W 4/02* | (2009.01) |
| *H04W 48/16* | (2009.01) |
| *H04W 88/06* | (2009.01) |

(52) U.S. Cl.
CPC ........... *H04W 48/18* (2013.01); *H04W 4/021* (2013.01); *H04W 48/16* (2013.01); *H04W 88/06* (2013.01)

(58) Field of Classification Search
CPC ...... H04W 48/18; H04W 48/16; H04W 88/06
USPC .................. 455/434, 419, 422.1, 436, 452.2; 709/203, 224, 227, 236
See application file for complete search history.

(56) References Cited

U.S. PATENT DOCUMENTS

| | | | |
|---|---|---|---|
| 7,289,454 B2 | 10/2007 | Bovo et al. | |
| 7,369,117 B2* | 5/2008 | Evans | G06F 3/0238 345/156 |
| 7,599,665 B2* | 10/2009 | Sinivaara | H04W 28/18 370/310 |
| 7,885,185 B2 | 2/2011 | van den Berg et al. | |
| 7,894,823 B2 | 2/2011 | Alemany et al. | |
| 2013/0250853 A1 | 9/2013 | Eravelli et al. | |
| 2013/0295986 A1 | 11/2013 | Mueck | |

FOREIGN PATENT DOCUMENTS

| | | |
|---|---|---|
| WO | 2013001547 A1 | 1/2013 |
| WO | 2013052651 A2 | 4/2013 |
| WO | 2013104565 A1 | 7/2013 |

\* cited by examiner

*Primary Examiner* — Amancio Gonzalez
(74) *Attorney, Agent, or Firm* — Lerner, David, Littenberg, Krumholz & Mentlik, LLP

(57) ABSTRACT

An apparatus and method determine an instance quality set of an access system while the access system is used by an application package of a radio device. The access system comprises a radio system and an access network. The application package has communicated information using a networked service of the access network. The apparatus and method determine additional information that comprises at least one of a location of the device and an acquisition time, the instance quality set, and a radio system identifier of the radio system used. The apparatus and method perform at least one of storing within the radio device and transmitting from the radio device an application identifier of the application package in association with the additional information. The apparatus and method selects at least one of a preferred radio system and a preferred application package based on the instance quality set.

20 Claims, 12 Drawing Sheets

GSM/WCDMA HARMONIZED RADIO SYSTEM QUALITY

| SignalStrength | Quantization of SignalStrength, Qgss | bitErrorRate | Quantization, Qber |
|---|---|---|---|
| 28 to 31 | 9 | 0 | 9 |
| 25 to 28 | 8 | 1 | 8 |
| 22 to 25 | 7 | 2 | 7 |
| 19 to 22 | 6 | 3 | 6 |
| 16 to 19 | 5 | 4 | 5 |
| 13 to 16 | 4 | 5 | 4 |
| 10 to 13 | 3 | intentionally left blank | 3 |
| 5 to 10 | 2 | 6 | 2 |
| 1 to 5 | 1 | 7 | 1 |
| 0 | 0 | intentionally left blank | 0 |

TD-SCDMA HARMONIZED RADIO SYSTEM QUALITY

| dBm | Quantization Level- Qrssi |
|---|---|
| -80 and higher | 9 |
| -80 to -85 | 8 |
| -85 to -90 | 7 |
| -90 to -100 | 6 |
| -100 to -110 | 5 |
| -110 to -112 | 4 |
| -112 to -115 | 3 |
| -115 to -117 | 2 |
| -117 to -120 | 1 |
| -120 and lower | 0 |

*FIG. 7*

LTE HARMONIZED RADIO SYSTEM QUALITY

| rsrp | Quantization Level, Qrsrp | rsrq | Quantization Level, Qrsrq | rssnr | Quantization Level, Qsnr |
|---|---|---|---|---|---|
| -80 and higher | 9 | -5 and higher | 9 | 21 and higher | 9 |
| -80 to -85 | 8 | -6 | 8 | 18 to 21 | 8 |
| -85 to -90 | 7 | -7 | 7 | 15 to 18 | 7 |
| -90 to -95 | 6 | -8 | 6 | 12 to 15 | 6 |
| -95 to -100 | 5 | -9 | 5 | 9 to 12 | 5 |
| -100 to -105 | 4 | -10 | 4 | 6 to 9 | 4 |
| -105 to -110 | 3 | -13 to -11 | 3 | 3 to 6 | 3 |
| -110 to -115 | 2 | -15 to -13 | 2 | 0 to 3 | 2 |
| -115 to -120 | 1 | -17 to -15 | 1 | -3 to 0 | 1 |
| -120 and lower | 0 | -17 and lower | 0 | -5 and lower | 0 |

CDMA/1X HARMONIZED RADIO SYSTEM QUALITY

| dBm | Quantization Level, Qrssi | ecio | Quantization Level, Qecio |
|---|---|---|---|
| -80 and higher | 9 | -80 and higher | 9 |
| -80 to -85 | 8 | -80 to -90 | 8 |
| -85 to -90 | 7 | -100 to -110 | 7 |
| -90 to -100 | 6 | -110 to -120 | 6 |
| -100 to -110 | 5 | -120 to -130 | 5 |
| -110 to -112 | 4 | -130 to -140 | 4 |
| -112 to -115 | 3 | -140 to -150 | 3 |
| -115 to -117 | 2 | -150 to -160 | 2 |
| -117 to -120 | 1 | -160 to -170 | 1 |
| -120 and lower | 0 | -170 and lower | 0 |

EVDO HARMONIZED RADIO SYSTEM QUALITY

EVDO Signal Quality = 0.7 * Qsnr + 0.3 * Qrssi, Use round(value) to determine the bucket

| dBm | Quantization Level- Qrssi | signalNoiseRatio | Quantization Level- Qsnr |
|---|---|---|---|
| -80 and higher | 9 | 8 | 9 |
| -80 to -85 | 8 | 7 | 8 |
| -85 to -90 | 7 | 6 | 7 |
| -90 to -100 | 6 | 5 | 6 |
| -100 to -110 | 5 | 4 | 5 |
| -110 to -112 | 4 | | intentionally left blank |
| -112 to -115 | 3 | 3 | 3 |
| -115 to -117 | 2 | 2 | 2 |
| -117 to -120 | 1 | 1 | 1 |
| -120 and lower | 0 | 0 | 0 |

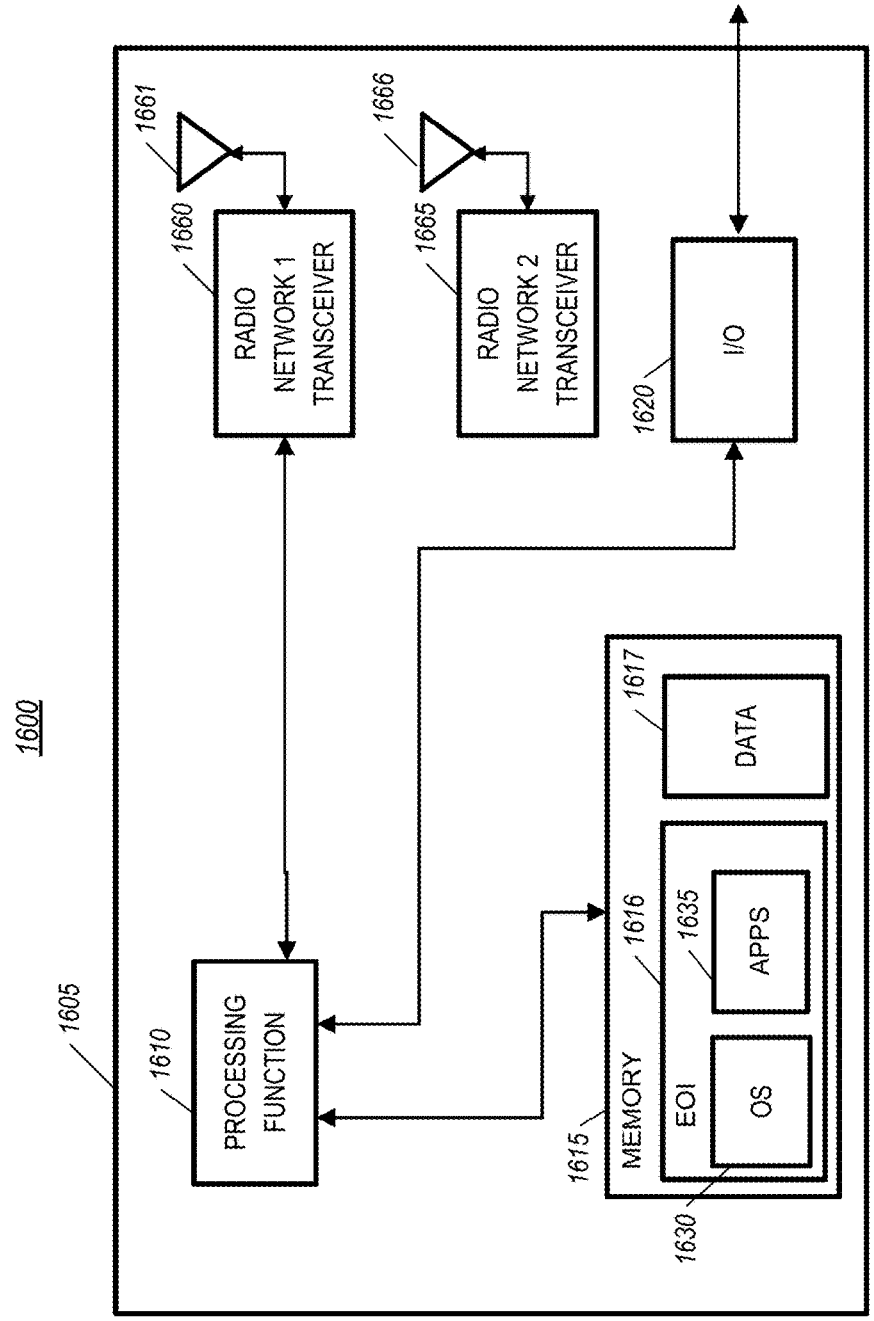

APPARATUS AND METHOD FOR OPTIMIZING PERFORMANCE OF A RADIO DEVICE

CROSS-REFERENCE TO RELATED APPLICATIONS

The present application is a divisional of U.S. patent application Ser. No. 14/319,111, filed on Jun. 30, 2014, the disclosure of which is incorporated herein by reference.

FIELD OF THE INVENTION

The present invention relates generally to wireless networks, and more specifically to improving application performance in radio devices of wireless networks.

BACKGROUND

Many client radio devices, such as cellular radio devices, have one or more application packages installed in the radio devices that are designed to connect to a server to use an associated application service. Many of these radio devices have the capability of using one of two or more radio network types to connect the radio device to the server. For example, many radio devices have a capability to use either a cellular network or a Wi-Fi network. Some devices have a capability to operate using two different cellular telephone technologies that are related by being different generations of a common technology. Some devices can operate on more than one cellular system, using multiple SIM (subscriber identity module) cards. In such circumstances, a selection can be made as to which radio network to use to obtain the best service. In such circumstances the selection may be made by the operator.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments that include the claimed invention, and explain various principles and advantages of those embodiments. The description is meant to be taken in conjunction with the accompanying drawings in which:

FIG. 6 is a table that is used to determine a harmonized radio quality for a particular instance in a GSM/WCDMA radio system, in accordance with certain embodiments.

FIG. 7 is a table that is used to determine a harmonized radio quality for a particular instance in a TD-SCDMA radio system, in accordance with certain embodiments.

FIG. 8 is a table that is used to determine a harmonized radio quality for a particular instance in an LTE radio system, in accordance with certain embodiments.

FIG. 9 is a table that is used to determine a CDMA/1× harmonized radio quality for a particular instance in a CDMA/1× radio system, in accordance with certain embodiments.

FIG. 10 is a table that is used to determine a harmonized radio quality for a particular instance in an EVDO radio system, in accordance with certain embodiments.

FIG. 16 is a block diagram that shows an apparatus block diagram of an electronic device, in accordance with certain embodiments.

Figure 1:
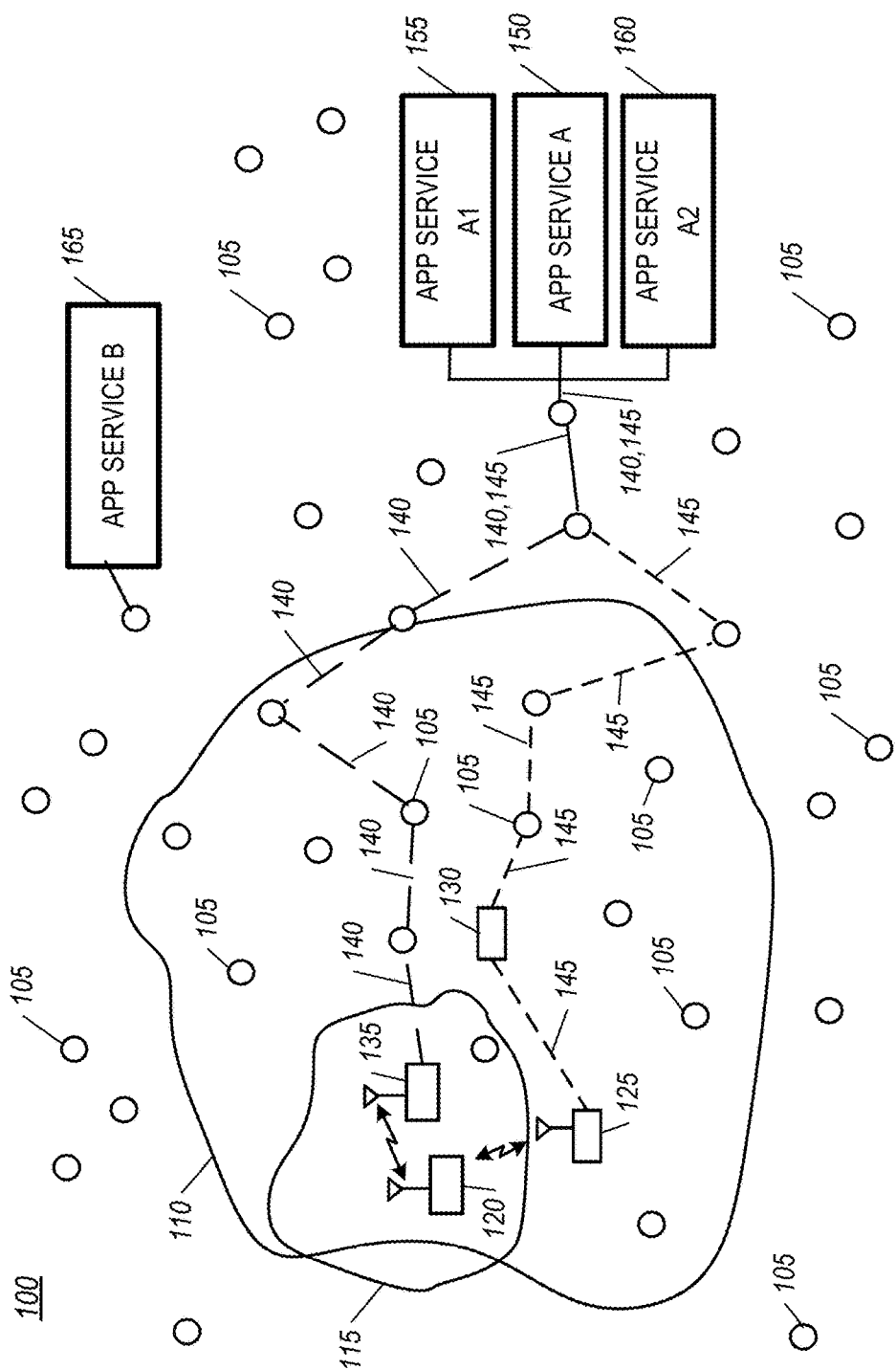
FIG. 1 is a topographical diagram shows a portion of a communication environment, in accordance with certain embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings.

Embodiments described herein generally relate to devices and methods that permit a radio device that has a capability to operate in more than one radio system to select a preferred radio system for a particular application package used by the radio device. The particular use typically has a use time and use location. The selection may be influenced by access system selection parameters. For example a relative weight of energy cost and access system performance may be used as access system selection parameters; when a radio device has a low battery, the weight of energy cost may be greater than the weight of radio device performance.

The selection may be based on historical information obtained by combining instance reports of previous uses of radio systems for the application. This could be done within one radio device, or by using a plurality of instance reports, referred to herein as instance tuples, from a plurality of radio devices. The historical information may comprise a plurality of selection records, referred to herein as selection tuples, each including a time range and a geographic region, as well as a set of selection quality information. A server may be used to collect and combine instance tuples from a plurality of radio devices, thereby providing a more broadly based set of historical information. An instance is defined as the connection of an application package to a server, using an access system at a particular time and location. The access system comprises a radio system and an associated access network Referring to FIG. 1, a topographical diagram shows a portion of a communication environment 100, in accordance with certain embodiments. The communication environment 100 comprises a plurality of nodes 105 (not all nodes are shown with a figure reference number in FIG. 1). The communication environment 100 may comprise multiple networks owned by different network operators, such as different enterprises and different web service providers. Each network typically has at least one router to provide internetwork communications, which allows nodes within one network to communicate with nodes in other networks. For simplicity, network boundaries and explicit inter nodal links are not shown. The set of all networks that are interconnected using internet protocol is the internet, or World Wide Web. In FIG. 1, some of the nodes 105 may be routers. Routers also serve to determine paths for communication packets, voice information, and streaming data that is moved from one location in the communication environment to another. There are millions of nodes in the World Wide Web.

The communication environment 100 also includes radio networks and radio devices. Range boundaries 110, 115 of two radio networks are shown in FIG. 1. The radio networks 110, 115 will be referred to using their range boundaries for simplicity. A first radio network 110 is a wide area radio network such as a cellular radio network or a public safety trunking radio network A second radio network 115 is a local area radio network, such as a Wi-Fi network used in a home or building. A radio device 120 is shown within the boundaries of the first and second radio networks 110. 115. It will be appreciated that a wide area radio network such as radio network 110 may have many radio devices such as radio device 120 operating therein, such as from hundreds to hundreds of thousands of radio devices. Local area radio networks such as Wi-Fi networks typically have far fewer radio devices operating therein; typically less than one hundred. Some radio devices, such as radio device may have the capability to operate in multiple radio networks from one location, as illustrated for radio device 120. The wide area radio network 110 has a base station 125 that has established an active radio link with radio device 120. Information from and to radio device 120 passes through the base station 140 125 to a network controller 130 that acts as a router for the radio network 110 passing the information between the internet and the radio device 120. The local area network 115 has a radio node 135 that performs the functions of a base stations and router, providing a connection for information between the radio device 120 and the internet Radio networks typically have a plurality of channels from which a channel is selected to provide communications between a radio device and the radio network. "Channel" in this sense may be defined by characteristics such as a frequency band, a time division type, a code division type, and a data rate. In some radio networks, the reliability of communications may vary significantly between radio channels. For the purpose of this document, a radio system is a channel or group of channels that provide similar reliability of communications for a radio network for random locations and time. For some radio networks, the radio system is synonymous with the radio network because all channels provide similar reliability at the random locations and times. Other networks can be represented by a plurality of radio systems. For example, a Wi-Fi network may have channels characterized by sets of broadcasting frequencies that differ widely, and as a result each set may form a different radio system. Radio networks that use the same radio protocol and operate at overlapping geographic regions, and which may use some common equipment such as radio towers, but which have at least some independent electronic hardware, such as antennas, backhaul facilities, or network controllers, are treated as different radio networks.

Radio device 120 is a radio device that is capable of communicating using more than one radio system at least one location. Some examples of radio devices are mobile telephones, radio equipped pads, radio equipped tablets, sign post mounted radio monitors (such as some traffic cameras), fire department radios, police department radios, and radio equipped sensors. Some radios of each of these types of radio devices are capable of communicating information by using one of more than one radio system. Radio device 120 has installed therein a plurality of application packages. Certain of these application packages communicate information between the radio device 120 and a required application service. The required application service is located in a server of the communication environment 100 external to the radio device 120 and is accessed by using a network address of the application service. An example of an application service is AccuWeather.com. The application package in the radio device 120 that requires Accuweather.com is called AccuWeather.

When a radio device activates an application packet that requires communication with an application service, the radio device must establish a connection between the radio device and the application service. When the establishment of the connection is not accomplished by a wired connection, (such as an ethernet connection) the connection is established using a radio system and an access network. In the case of radio device 120, there are at least two radio systems available because the radio device 120 is operating within range of the two radio networks 110, 115. When the radio device 120 has more than one radio system available, one radio system is selected, either by a user or by using stored information that determines the radio system. When the radio system has been selected, the connection may be established between the application package and the application service using the selected radio system and an access network that couples the radio system to the node associated with the application service. Referring again to FIG. 1, a situation is illustrated for radio device 120 for which radio device 120 has two radio systems 110, 115 from which to select to in order to make the connection to application service A 150, and has the capability to use either one. The two connections are shown by links 140, 145. The links 140 form a first access network and the links 145 form a second access network. The links 140 and the radio system 115 form a first access system, and the links 145 and radio system 110 form a second access system. It will be appreciated that closely related applications are likely to use application services that get connected using very similar access networks for a given radio system, since they are likely to be connected through one node. For example, the Google Search application may be the application service A 150, while Google Map application may be the application service A1 155 and the Google Earth application may be the application service A2 160. However, different applications will likely end up having different access network. For example, Application B 165 is likely to have an access network that is different than first and second access networks 140, 145.

The usefulness of a connection between an application package of the radio device 120 and the application service can be generally characterized by data throughput, data latency, and energy consumption. In general, data throughput and energy consumption are more closely related to the chosen radio system and data latency is more closely related to the access network that results from the selection of the radio system; i.e., the access network is associated with the radio system. When a radio device that can utilize two or more radio systems uses an application, a selection of one of the radio systems may be made to optimize characteristics of importance for the instance of use of the application. Historical information may be beneficially used to make the selection.

Figure 2:
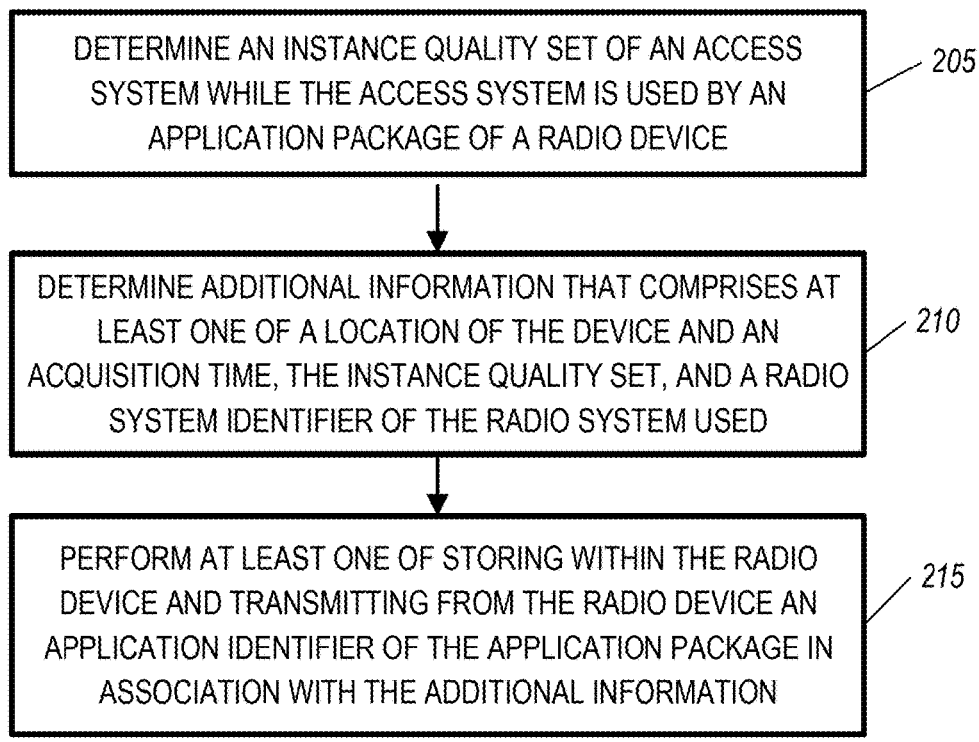
FIG. 2 is a flow chart that shows some steps of a method for determining and using an instance tuple, in accordance with certain embodiments.

Referring to FIG. 2, a flow chart 200 shows some steps of a method for determining and using an instance tuple, in accordance with certain embodiments. These steps may be performed by a unique application package within the radio device, identified herein as a radio system selection function. At step 205 an instance quality set of an access system is determined while the access system is used by an application package of a radio device. The access system comprises a radio system and an access network. The application package has communicated information with a networked service of the access network. An application identifier of the application package is associated at step 210 with additional information. The additional information comprises at least one of a location of the device and an acquisition time. The additional information further comprises the instance quality set and a radio system identifier of the radio system used. A combination of the application identifier and additional information may also be referred to as an instance tuple. The instance tuple is either stored in the radio device or transmitted to a server, or both at step 215. The storage in the radio device may be only temporary, lasting until the radio device uses the instance tuple to update a selection tuple stored within the radio device. When the instance tuple is transmitted, the instance tuple may be used by a server to update a selection tuple stored by the server. In some embodiments, the location may generated by a location application of the radio device as either a fairly precise location, such as latitude and longitude, or may be generated as a geographic region, such as a geohash. The geohash may compatible with geographic storage specifications for the selection tuples. If the location is generated as a fairly precise location, an application that updates the selection information may convert the location to a geographic region that is compatible with the standards of the selection tuples. This conversion may take place in either the radio device or the server that updates selection tuples, or both. In a somewhat corresponding manner, the time may generated by a time application of the radio device as either a fairly precise time, such as year, date, hour, minute and second, or may be generated as a time range, such week, day, and hour group that is compatible with selection tuple standards. If the time is generated as a fairly precise time, an application that updates the selection information may convert the time to a tine range that is compatible with the selection tuple standards. This conversion may take place in either the radio device or the server that updates selection information, or both.

The instance quality set comprises values determined from measurements. In some embodiments, all the measurements are obtained passively. In some embodiments at least one measurement is obtained passively, and in these embodiments typically most of the measurements are made passively. The measurements are used to calculate and/or perform a table look up to determine qualities associated with the use of an application at a particular time, at a particular location, with the particular one radio system. The use of a plurality of instance tuples enables selection of a preferred radio system for the application at the time and location. "Obtained passively" means that the measurements are available within the radio device because they are used for existing functions of the radio that are functions other than the functions of the embodiments described herein. Therefore, they are obtained without adding radio traffic. Typically, they are already defined to exist in specific storage locations of the radio device that the methods describe herein can access. They may include, for example, downlink bit throughput information and/or delays, and/or message times than can be used to determine delays, or delays determined by the radio device.

Figure 3:
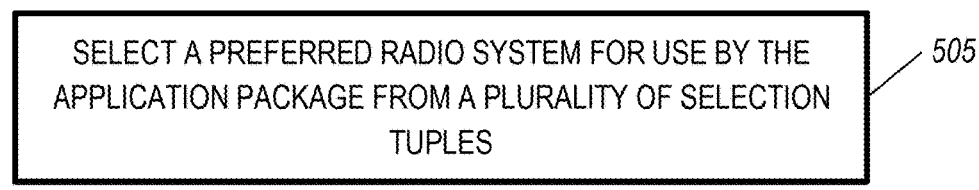
FIGS. 3-5 are flow chart that show additional steps of the method described with reference to FIG. 2.

Referring to FIG. 3, a flow chart 300 shows a further step of the method 200 described with reference to FIG. 2. These steps may be performed within the radio device or at a server within a network to which the radio device can connect for the selection function. At step 305, a preferred radio system is selected for the radio device to use for the application package. The selection is made from a plurality of selection tuples that include the application identifier, and may include a set of access system selection parameters. Step 305 is therefore a very specific situation in which the radio device has determined an instance tuple and is using the application identifier, time, and location information in the instance tuple, optionally along with a set of access system selection parameters, to determine a preferred radio system to use for the application at the time and location of the instance tuple. Since the radio device is characterized as being able to operate in two radio systems, the radio device will presumably be creating at least two instance tuples, one for each radio system. Both of the instance tuples will include, for practical purposes, the same time and location information. The set of radio device selection parameters may not be included, in which case a selection may be based on a set of default access system parameters. For example the default access system selection parameters may use only a harmonized access system performance to select the radio system. Alternatively, the set of radio device selection parameters may comprise weights to be used for a plurality of parameters. For example, the harmonized access system performance and an energy cost may be used in a weighted manner to select the preferred radio system, based on access system performance parameters determined from a selection quality set. The application identifier is used along with the time and location information to select a preferred radio system based on the application, the time, the location, a selection quality set, and the access system performance parameters, using at least two selection tuples that have common application identifications, time ranges, and location regions. The selection quality set in a selection tuple is generated from the instance quality sets of the current and previous instance tuples (if any).

Figure 4:
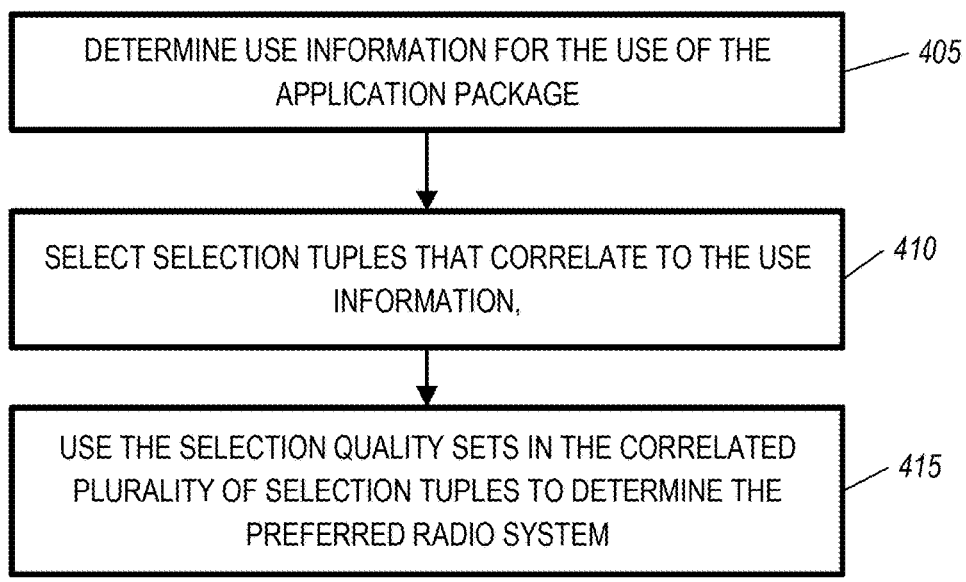

Referring to FIG. 4, a flow chart 400 shows some steps of a method for performing step 305 described with reference to FIG. 3. At step 405, use information is determined for the use of the application. The use information comprises the application identifier and one or more of the time of the instance and the location of the instance. This is a very specific type of selection, based on instance information. It will be appreciated that in certain embodiments, the use time is not needed; the selection tuple in these embodiments does not distinguish different time ranges. In some embodiments, different locations may not be distinguished. At step 410, selection tuples are selected (from all available selection tuples) that correlate to the use information. Each selection tuple comprises an application identifier, a radio system identifier, at least one of a time range and a location region, and a selection quality set. Correlation means that the application identifier is common to all selected tuples and that the at least one of the use time and use location correspond to the time range and location range in the selection tuple. In some embodiments, if a use time is not included in the use tuple, the use time is not used for the selection of the selection tuple. In some embodiments, if not use time is included in the use tuple, no selection tuples are selected. Similar logic may be used for the use location. At step 415, when a plurality of selection tuples do correlate to the instance information, the selection quality sets are used to determine the preferred radio system. As inferred above, the selection of the preferred radio system and application package determines an associated access network that is assumed to be similar for all such selections, and therefore the access system is also assumed to be similar. In some embodiments, additional access system parameters and/or an application genre may be used to select the radio system, or a radio system and application package. This is described more fully below.

Figure 5:
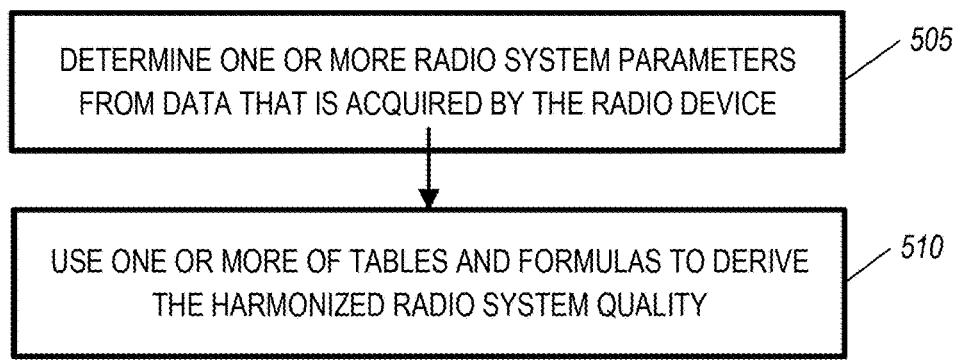

Referring to FIG. 5, a flow chart 500 shows some steps of a method for performing step 205 described with reference to FIG. 2, in accordance with certain embodiments in which the instance quality set includes a harmonized radio system quality. At step 505, one or more radio system parameters are determined from data that is acquired by the radio device. In some embodiments, the data that is acquired by the radio device is acquired passively. The radio system parameters depend upon the type of the radio system. In some embodiments, the radio system types are Wi-Fi, GSM/WCDMA, TD-SCDMA, LTE, CDMA/1×, and EVDO. These system types are well known. Other radio system types may be modeled similarly. The parameters are selected so as to enable a determination of a harmonized radio system quality, which is a composite value determined from parameters that are in two classes: those most closely related to signal strength (referred as Qsignal_level_parameters) and those most closely related to signal quality (referred to as Qsignal_quality_parameters). For each particular radio system, the parameters may be parameters that are defined by standards for the particular radio network of the radio system, and are values that are typically already used within the radio devices of the particular network, and which are therefore passive. The signal level parameters typically have dBm as their unit of measurement, whereas the signal quality parameters have dB as their unit of measurement. The composite value is determined as $Q_{RADIOSYSTEM}=\Sigma|\text{weight}(i)*\text{Qsignal\_level\_parameter}(i)+\Sigma\text{qweight}(j)*\text{Qsignal\_quality\_parameter}(j)$. Many radio networks have a total of less than 5 total signal level and signal quality parameters. For example, the LTE system harmonized radio system quality that is described below is determined from two signal level parameters (snr and rsrp) and one signal quality level parameter (rsrq). The weights in the formulas given below have been determined by computer modeling techniques for the list of systems given above and this process can be done for other systems. The result of the modeling is a set of harmonized radio quality tables and formulas that provides a set of harmonized radio system qualities from the radio parameters. The harmonized radio system quality is such that equivalent values for different radio systems predict approximately equivalent radio system performance (e.g., a specified combination of throughput and latency) at all values of $Q_{RADIOSYSTEM}$ A harmonized radio system quality for a particular instance in a Wi-Fi radio system is determined as follows:

$$Q_{WIFI}=\text{MIN}(0,\text{MAX}(10,2*(\text{RSSI}-(\text{WIFI\_NOISE\_FLOOR}-\text{Inter\_5}))/10)$$

This formula determines the harmonized radio system quality from the radio system parameters RSSI, WiFi_Noise_Floor, and Inter_5. The RSSI parameter is defined in standards for this type of radio system. The WiFi_Noise_Floor is signal level below which a downlink QPSK modulated data signal is not reliably received, which may be −95 dBm for some radio systems. In some embodiments, the parameter RSSI (Received Signal Strength Indication) is obtainable from a passive value acquired by the radio device. Inter_5 is a quantity of co-channel transmitters of the same type of radio system as the radio device is using. The co-channel transmitters are operating within radio range of the radio device and the RSSI's determined by the radio device for signals received from the co-channel transmitters indicate a received signal power that is within ±5 dB of the signal strength received by the radio device during communications by the application package from the radio system. The radio device determines these three values (WiFi_Noise_Floor may be a passive value in that it is stored in the radio devices of these embodiments). From the above formula these radio system parameters can be used to determine a harmonized radio system quality, $Q_{WIFI}$, for this instance of a Wi-Fi radio system.

Referring to FIG. 6, a table 600 that is used to determine a harmonized radio quality for a particular instance in a GSM/WCDMA radio system is shown, in accordance with certain embodiments. The table 600 has as inputs the radio system parameters gss, which is a signal strength value, and ber, which is a bit error rate. These values are defined in standards for this type of radio system. In some embodiments, these parameters are obtainable from a passive value acquired by the radio device. From the value of these parameters, a corresponding intermediate quantized quality value is determined. The corresponding intermediate quantized values Qber and Qgss are then used obtain a harmonized radio system quality for the GSM/WCDMA radio system in this instance from the following formula:

$$Q_{GSM/WCDMA}=\text{Round}(0.7Qber+0.3Qgss)$$

Referring to FIG. 7, a table 700 that is used to determine a harmonized radio quality for a particular instance in a TD-SCDMA radio system is shown, in accordance with certain embodiments. The table 800 has as an input radio system parameter rssi. This value is defined in standards for this type of radio system. In some embodiments, this parameter is obtainable from a passive value acquired by the radio device. The passive value is converted as necessary to a dBm value and a quantized rssi (Qrssi) is mapped from the table. The harmonized radio system quality ($Q_{TD-SCDMA}$) for the TD-SCDMA radio system in this instance is equivalent to the Qrssi determined for this instance.

Referring to FIG. 8, a table 800 that is used to determine a harmonized radio quality for a particular instance in an LTE radio system is shown, in accordance with certain embodiments. The table 900 has as inputs radio system parameters rsrp, rsrq, and rssnr. These values are defined in standards for this type of radio system. In some embodiments, these parameters are obtainable from a passive value acquired by the radio device. The passive values are converted as necessary to values that can be used as inputs to the table and intermediate quantized values Qrsrp, Qrsrq, and Qsnr are obtained from the respective input values rsrp, rsrq, and rssnr. The harmonized radio system quality for the LTE radio system in this instance is obtained by using the following formula:

$$Q_{LTE}=\text{Round}(0.2Qrsrp+0.3Qrsrq+0.5Qsnr)$$

Referring to FIG. 9, a table 900 that is used to determine a CDMA/1× harmonized radio quality for a particular instance in a CDMA/1× radio system is shown, in accordance with certain embodiments. The table 1000 has as inputs radio system parameters ecio and rssi. These values are defined in standards for this type of radio system. In some embodiments, these parameters are obtainable from a passive value acquired by the radio device. The passive values are converted as necessary to values that can be used as inputs to the table 1000 and intermediate quantized values Qrssi and Qecio are obtained from the respective input values rssi and ecio. The harmonized radio system quality for the LTE radio system in this instance is obtained by using the following formula:

$$Q_{CDMA/1X}=\text{Round}(0.2Qrsrp+0.3Qrsrq+0.5Qsnr)$$

Referring to FIG. 10, a table 1000 that is used to determine a harmonized radio quality for a particular instance in an EVDO radio system is shown, in accordance with certain embodiments. The table 1000 has as inputs radio system parameters rssi and snr. These values are defined in standards for this type of radio system. In some embodiments, these parameters are obtainable from a passive value acquired by the radio device. The passive values are converted as necessary to values that can be used as inputs to the table 1000 and intermediate quantized values Qrssi and Qsnr are obtained from the respective input values rssi and snr. The harmonized radio system quality for the EVDO radio system in this instance is obtained by using the following formula:

$$Q_{EVDO} = \text{Round}(0.3Qrssi + 0.7Qsnr)$$

It will be appreciated that by performing computer modeling, similar formulas may be determined that depend on the same radio parameters or using other radio parameters that result in harmonized radio system qualities.

Figure 11:
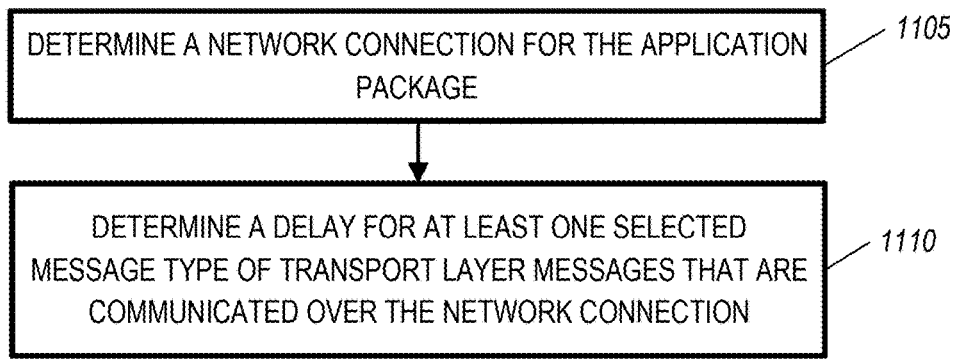
FIGS. 11-14 are flow charts that show additional steps of the method described with reference to FIG. 2.

Referring to FIG. 11 a flow chart 1100 shows some steps of a method for performing step 205 described with reference to FIG. 2, in accordance with certain embodiments in which the instance quality set includes a network delay, or latency. At step 1105 a network connection for the application package is determined. The network connection is needed so that the radio device can monitor messages going over the radio network and determine which ones are being communications by the application package. The messages that are using the network connection for the application package will have an internet protocol address unique for the application package while the application package is connected to the application service. At step 1110, a delay of a least one selected message type of transport layer messages is determined. (Transport layer refers to the ISO network model). The transport layer messages from which the message type is selected are transport layer messages that are communicated over the network connection on behalf of (i.e., as a result of) the application package. The transport layer messages are generated irrespective of the measurement of their delay. Thus, the measurement of the delay adds no radio traffic and is a passive means for obtaining a delay measurement. One example of a selected message type is the SYN message that is used in the well-known TCP protocol. The SYN message prompts a reply called SYN-ACK. This is one example of a message type from which an average delay can be obtained by determining the duration between the transmission of a SYN message and the reception of the associated SYN-ACK. The SYN message is used during the setup of a TCP connection. If a more accurate average delay is needed, then the delays between TCP payload packets and the acknowledgement for them may be used, or the RTT (round trip time) of the connection can be determined by using timestamps in the TCP packet headers. Other transport protocols have message types that are acknowledged so that a delay or average delay can be determined.

Figure 12:
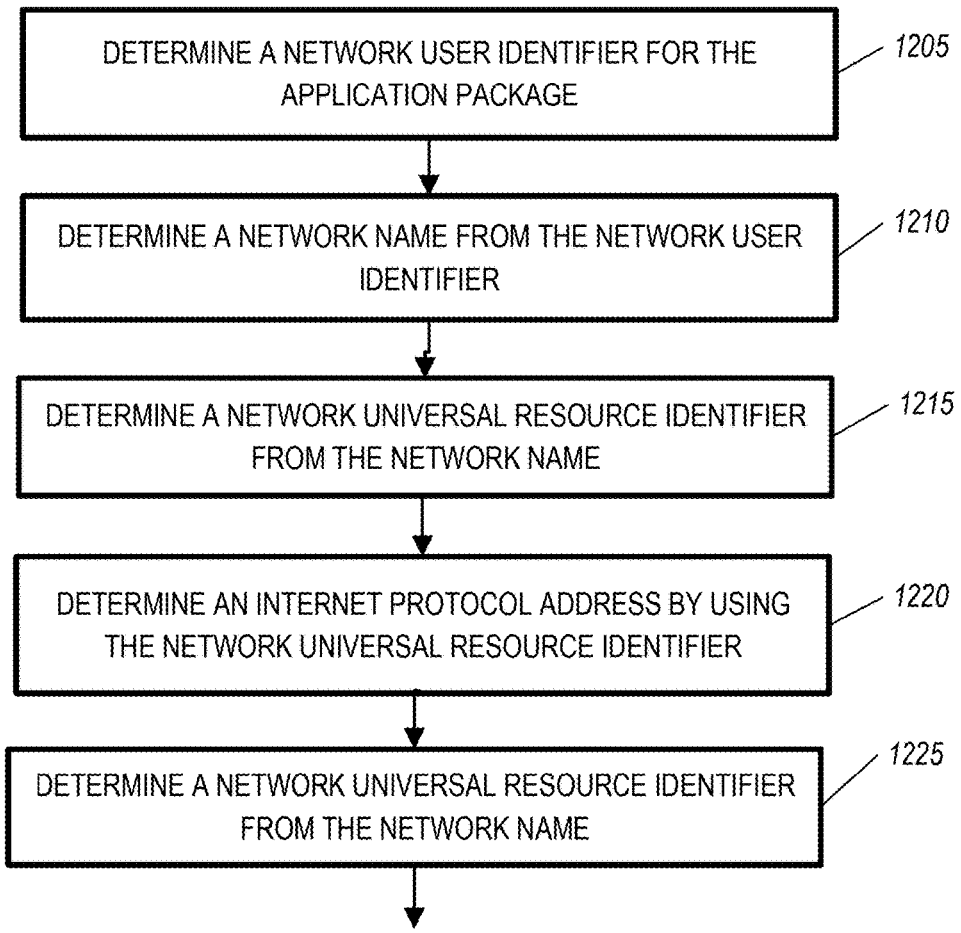

Referring to FIG. 12 a flow chart 1200 shows some steps of a method for performing step 1105 described with reference to FIG. 11, in accordance with certain embodiments. At step 1205, a network user identifier is determined for the application package. The network user identifier is unique to the application package in the radio device. The network user identifier may be assigned by the radio device when the application package is installed, which may be performed by software downloading. The network user identifier may be referred by different names in different radio systems or in different manufacturer's radio devices. The network user identifier may be obtained by the radio system selection function when the application packages is activated while the radio system selection function is running. At step 1210 a network name of the application package is determined, using the network user identifier, from a table of summary information about the application packages that is maintained in the radio device. Using the network name, a network universal resource identifier is determined at step 1215 by monitoring messages being sent or received over the radio system being used. From the network universal resource identifier, a network protocol address (i.e., a universal resource locater) can be determined at step 1220. The network protocol address can then be used at step 1225 to identify the messages being sent and received by the radio of the radio device that are connected to the application resource; i.e., the network protocol address is used to identify the connection to the application resource. These steps are one method of determining the network connection in step 1105 described with reference to FIG. 11; obvious variations may be used for radio devices having different operating systems.

The additional information described above with reference to step 210 described with reference to FIG. 2 may further include throughput information. The radio device selection function may obtain one or both of uplink and downlink byte counts, specifying the quantity of payload bytes communicated at the transport level during specified events, such as during a connection. The radio device selection function may also determine the duration of the event for which the byte counts have been made. This information may gathered by the radio device for use by other functions. It may therefore obtained passively, without adding any radio traffic. The byte counts can be used with duration information to determine an average uplink and downlink average throughput, and these throughputs may be combined to determine an overall average throughput. The combination may be simply adding the throughputs together or calculating a weighted sum of the throughputs.

The additional information described above with reference to step 210 of described with reference to FIG. 2 may further include energy cost information. This information includes the throughput information described above and further includes a TX (transmit) energy cost and an RX (receive) energy cost in terms of kilobits per milliampseconds. The RX cost is a stored constant depending on the radio device model. The TX cost is based on a stored constant depending on the radio device model, and modified by an average transmit power that is used during the connection. The average power can be determined from information used by other functions in the radio device, such as battery functions, and requires no additional radio traffic. Therefore, the determination of the energy cost is a passive determination. An uplink energy cost (UL_cost) is calculated as $$\text{UL\_cost(in mA)} = (TX \text{ bytes}*8/\text{duration of } TX \text{ bytes communicated})*1000*TX$$

Cost in Kbits·mAs.
A downlink energy cost (DL_cost) is calculated as $$\text{DL\_cost(in mA)} = (RX \text{ bytes}*8/\text{duration of } RX \text{ bytes communicated})*1000*RX$$

Cost in Kbits/mAs.
The total data cost in mA=UL_cost+DL_cost.
Asterisks indicate multiplication.

Figure 13:
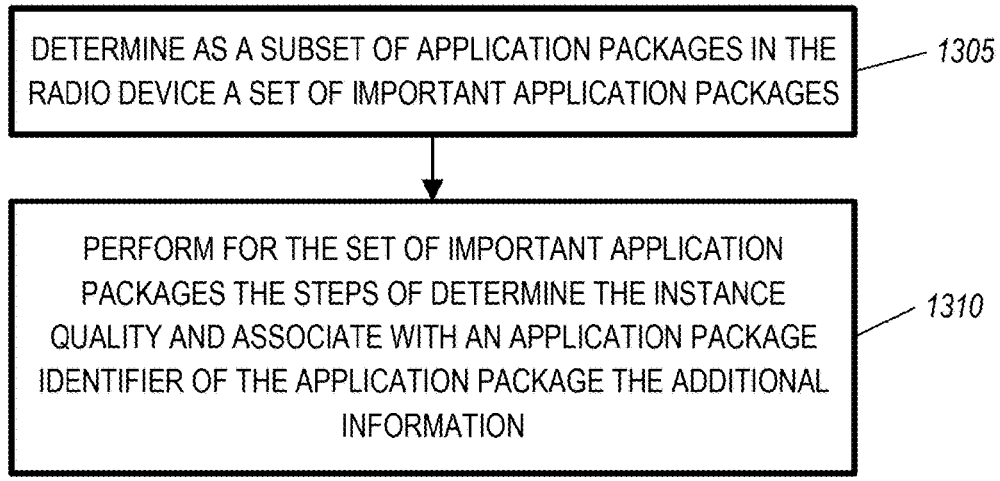

Referring to FIG. 13 a flow chart 1300 shows some additional steps of the method described with reference to FIG. 2, in accordance with certain embodiments. At step 1305, a subset of application packages that are installed in the radio device is determined. The subset may be confined to application packages that communicate over the radio network. The subset is termed an important subset of the application packages, or more simply, the important applications. Although the impact on the radio device from the radio device selection function is small or non-existent in terms of adding radio traffic, the radio device selection function does use up internal resources of the radio device, such as processor time, power, data storage and program storage. The added processor time, power, and program storage are not a significant percentage of the total of these resources, but storing the above described additional information for all network applications may add a significant amount of data storage memory. Furthermore, restricting the gathering of the additional information for each application and radio system does save some processor time and power. At step 1310, the step of determining the instance quality set (step 205, FIG. 2) and the step of associating additional information with the application package identifier for the application package of the instance for which the instance quality set is determined. In some embodiments, a network device that is performing selections for other radio devices sends a request to a specific radio device to have the radio device send an instance tuple to the network device. This may be done, for example, because the network device knows the location of the radio device at the current time and does not have sufficient instance reports at the location of the specific radio device. The specific radio device then sends the instance report, irrespective of the set of important applications in the radio device.

Figure 14:
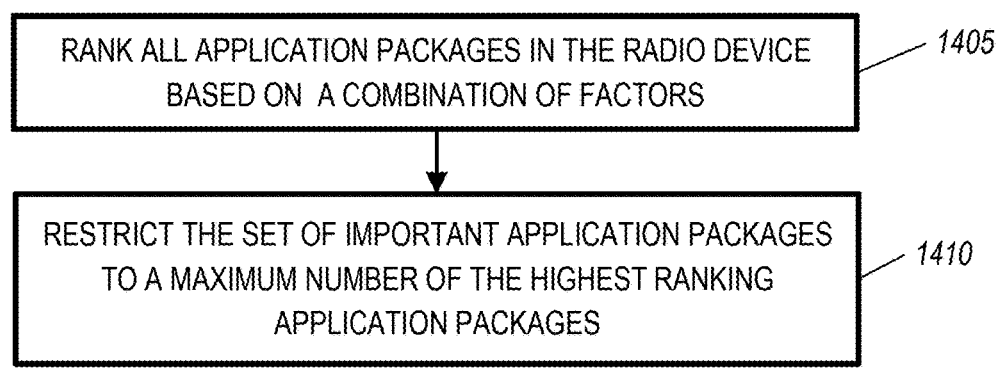

Referring to FIG. 14 a flow chart 1400 shows some steps of a method for performing step 1305 described with reference to FIG. 13. At step 1405, all the application packages in the radio device are ranked based on a combination of factors that include, for each application package, at least one of a connection activity of the application package and a throughput of the application package. In some embodiments, only application packages that are not network application packages are excluded. In some embodiments application packages that are not network applications are excluded and the remaining are ranked on the combination stated. Connection activity may be determined in TCP based applications by DNS (domain name server) requests, SYN-ACK messages, or packet acknowledgments. In other protocols similar activates may be used. In some embodiments, the activity for an application may be determined by a hierarchy of transport activity. For example, if a DNS is observed for an application package but no additional DNS activity is observed for a first period of time, then SYN-ACKS may be monitored, which may provide information that there is connection activity occurring without the application package going inactive. If no additional or low SYN-ACK activity is observed, then packet acks may be observed to determine if an application is active on one connection for a long period of time. It would be less efficient to depend on, for instance, only packet acks because too many processor resources may be used to monitor packet acks. An alternative to using these connection activity indicators is to use application throughput. The application throughout used for this purpose may be over a longer duration than that used for the throughput provided in the additional information used for instance reporting described above. It may be obtained by an average of the instance throughputs for a longer duration. Furthermore, the throughput used for application ranking may be obtained as an aggregate of such instance throughputs for all radio systems that the application package is used with. The connection activity factor and throughput factor may be combined using a product. When the applications have been ranked, the set of important application packages is restricted at step 1410 to a maximum number of the highest ranked application packages.

Figure 15:
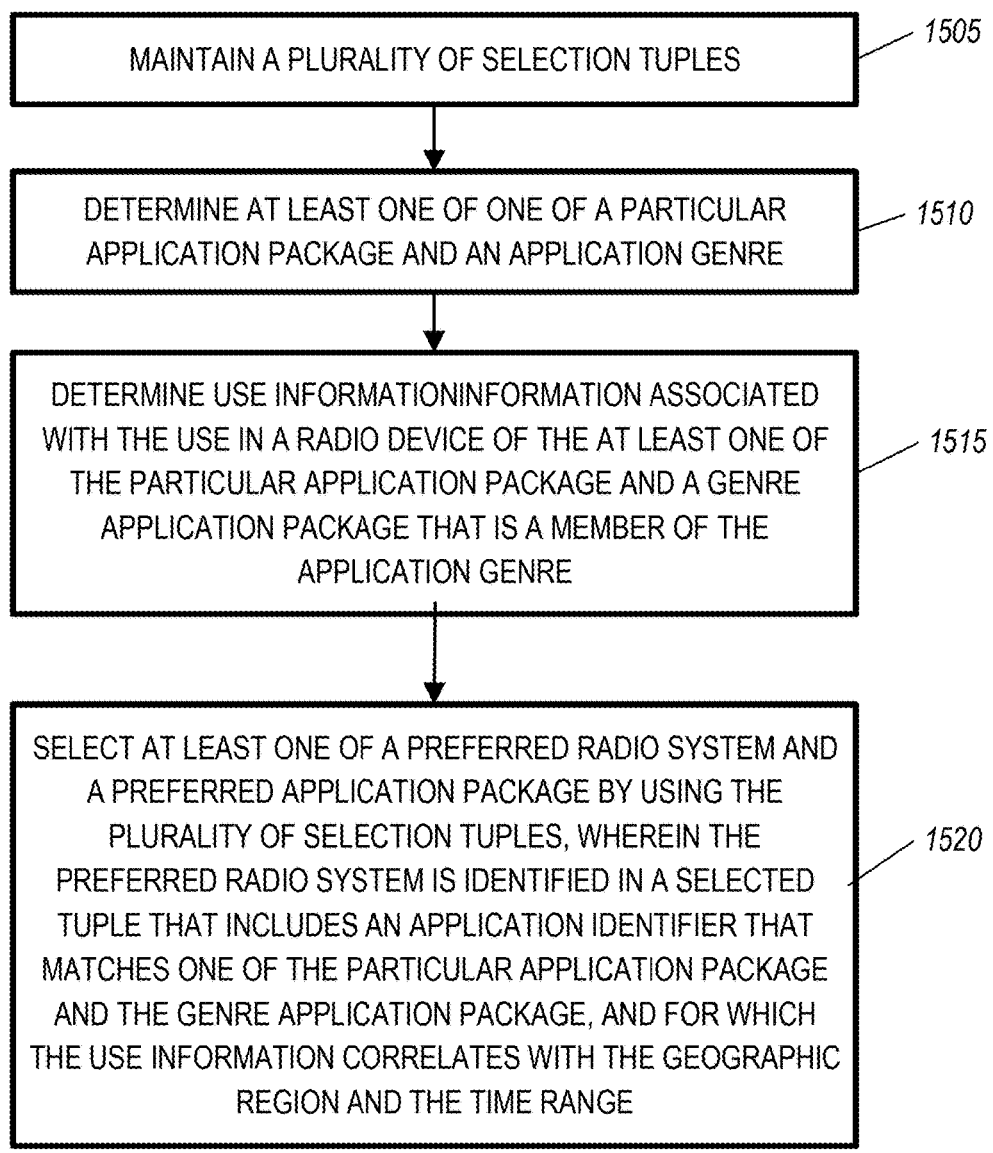
FIG. 15 is a flow chart that shows some steps of a method for selecting a preferred radio system.

Referring to FIG. 15, a flow chart 1500 shows some steps of a method for selecting a preferred radio system. The method may be used within a radio device or a network, such as within one or more servers. At step 1505, a plurality of selection tuples are maintained. Each selection tuple comprises an application identifier and additional information. The additional information comprises a radio system identifier, a geographic region, a time range, and a selection quality set. At step 1510, one of a particular application package and application genre is determined. The application genre is a set of related application packages, also called genre application packages. The determination may be made when a network application package or application genre is activated within a radio device. Use information is determined at step 1515. The use information comprises at least one of a use time and use location. The use time may be the present time or a future time at which one of the particular application and a genre application is used. The use location is the location of the radio device at the use time. At step 1520, one of the preferred radio system and the genre application is selected by using the plurality of selection tuples. The preferred radio system is identified in a selected tuple that includes an application identifier that matches one of the particular application identifier and the genre application package, and for which the use information correlates with the geographic region and the time range. Correlation occurs when (1) the use time is within the time range and (2) the use location is within the geographic region. In some embodiments, only one of the two matches have to occur to deem that correlation has occurred. For example, in some embodiments, a use time and time range may not be necessary.

Each of the plurality of selection tuples may obtained from one or more instance tuples. The one or more instance tuples include locations within a common geographic region, acquisition times within a common time range, and common radio system identifiers.

The time ranges in the selection tuples may be repeating time intervals, such as hour groups during a day (e.g., 6:00 AM-9:00 AM, 9:00 AM-2:00 PM, 2:00 PM-6:00 PM, and 6:00 PM-6:00 AM, and day of week. This would define 28 different time ranges for the selection tuples. The locations may be geohashes, which are well known to represent specific geographic regions of earth using a series of characters. Other systems could be used, such as latitude and longitude range combinations, or locational geocodes, as just two examples. When a new instance tuple is found to correlate to a selection tuple, the selection quality set is updated using the instance quality set. In one example of some embodiments, the instance quality set for Wi-Fi may comprise the following fundamental quality values: a RSSI value, a number of co-channel neighbors that are within the specified signal strength range, UL bytes, DL bytes, connection time, SYN delay, TX cost, and RX cost. In some embodiments, the instance quality set for Wi-Fi may alternatively comprise mid-level quality values. The mid-level quality values are values derived from the fundamental values. For example, the Wi-Fi instance quality set may comprise the harmonized Wi-Fi radio system quality $Q_{WIFI}$, energy cost, latency, and throughput as mid-level quality values. In some embodiments, the instance quality set for Wi-Fi may alternatively comprise high level quality values. The high level quality values are values derived directly from the fundamental values or from the mid-level quality values. For example, the Wi-Fi instance quality set may comprise the Wi-Fi harmonized access system performance, which in some embodiments is determined as $Q_{WIFI}$*Latency*Throughput (asterisks indicate multiplication), and the energy cost. By this categorization, it can be seen that some quality values may be defined for two levels. For example, energy cost may be a mid-level and high-level quality value.

As noted above, selection tuples are obtained from instance tuples for which the use information correlates with the geographic range and the time range. When an instance tuple is generated by a radio device and temporarily stored within the radio device to be used by a radio system selection function of the radio device, or is transmitted by a radio device and received at a server that has a server radio system selection function, the correlation process attempts to find an existing selection tuple to which one or more previous instance tuples have correlated. If none exist, then a new selection tuple is created to which the instance tuple does correlate. The selection tuple is then updated. In some embodiments, selection tuples may be stored with fundamental level quality values, mid-level quality values, or high level quality levels when the instance tuples are fundamental level quality values. In some embodiments, the instance tuples comprise mid-level quality values, in which case the selection tuples may be stored with mid-level or high level quality values. In some embodiments, the instance tuples comprise high level quality values, in which case the selection tuples may be stored with high level quality values. In some embodiments, the updating of selection tuples is done by converting the level of the instance quality values to the same level as the selection quality values, incrementing a stored number of instance tuples that have been used to update the selection tuple, generating a new average value of the selection tuple quality values.

The determination of a preferred radio system described with reference to step 1520 of FIG. 15 may be made based on one or more of the selection tuples that include an application identifier that matches the particular application identifier, and for which the use information correlates with the geographic region and the time range of the one or more selection tuples. These are called correlating selection tuples. The selection quality set of each of the one or more correlating selection tuples are used to make the determination. Because each of the correlating selection tuples are generated based on common geographic region, common time range, and common radio systems, the correlating selection tuples have common time ranges, common geographic regions, but differing radio systems.

Energy cost may or may not be a factor in the determination of a preferred radio system. In some embodiments, when the radio device has more than a threshold amount of battery energy remaining, energy cost may not be involved in the determination of a preferred radio system. In this case the radio system may be determined from a correlating selection tuple that has a best harmonized access system performance.

In some embodiments, when the radio device has less than a threshold amount of battery energy remaining, the determination of a preferred radio system is made based further on an energy cost that is determinable from the selection quality set. This may be accomplished by performing a weighted sum of the harmonized access system performance and the energy cost, with the weight of the energy cost being varied according to the amount of battery energy remaining in the radio device, or the amount of battery energy above a threshold remaining in the radio device. The selection tuple having the highest weighted value is selected, which identifies the preferred radio system.

In some embodiments, all applications in a particular genre of applications may provide a desirable function, and both a preferred radio system and a preferred application package are selected. The selection is made based further on an energy cost that is determinable from the selection quality set. This may be accomplished by performing a weighted sum of the harmonized access system performance and the energy cost, with the weight of the energy cost being varied according to the amount of battery energy remaining in the radio device, or the amount of battery energy above a threshold remaining in the radio device. The selection tuple having the highest weighted value of all selection tuples that have an application package identifier that identifies a genre application of the particular application genre is selected, which identifies the preferred radio system and preferred application package.

Referring to FIG. 16, a block diagram 1600 shows an apparatus block diagram of an electronic device 1605, in accordance with certain embodiments. Apparatus and functional aspects of the electronic device 1605 may exist in the radio device 120 described herein above with reference to FIG. 1. The electronic device 1605 includes a processing function 1610 comprising one or more processing devices, each of which may include such sub-functions as central processing units, cache memory, instruction decoders, just to name a few. The processing function 1610 executes program instructions which may be located within memory in the processing devices, or may located in a memory 1615 external to the processing function 1610, to which the memory 1615 is bi-directionally coupled, or in a combination of both. The program instructions that are executed may include, in certain embodiments, instructions for performing the method steps described with reference to flow charts shown in FIGS. 2-15. The processing function 1610 is further coupled to a first wireless radio network receive-transmit function (transceiver) 1660 that is coupled to a radio antenna 1661, which may be internal or external to the electronic device 1605, and to a second radio network receive-transmit function (transceiver) 1665 that is coupled to a radio antenna 1666. In some embodiments the radio network receive-transmit functions 1660, 1665 each comprises one or more processors and memory, and may also comprise circuits that are unique to radio protocols defined by an industry standard, and may referred to as a radio device transceiver. The radio network receive-transmit function 1660 in some embodiments is a cellular receiver-transmitter, and the radio network receive-transmit function 1665 in some embodiments is a Wi-Fi receiver-transmitter. In some embodiments, the radio device 1605 may have three or more receiver-transmitters, each capable of operating in a different radio network. The receiver-transmitters 1660, 1665, and any additional receiver-transmitters can provide communications for one or more radio systems that are each classified as providing substantially the same harmonized access system performance for all network applications, but which provide different access system performance from other of the radio systems for all network applications.

The apparatus block diagram 1600 shows the executable operating instructions (EOI) 1616 being stored in the memory 1615 external to the processing function 1610. The memory 1615 also stores data 1617. The EOI 1616 of the radio device 1605 includes groups of instructions identified as an operating system (OS) 1630 and applications 1635. The combination of the processing function 1610 and the EOI 1616, or the processing function 1610, the EOI 1616, and the data 1617 is also referred to as the processing system of the electronic device 1605. The processing function 1610 may include input/output (I/O) interface circuitry and may be coupled to separate input/output interface circuitry 1620 that is controlled by the processing function 1610. The I/O 1620 provides for communications to hardware elements of the electronic device, such as keys, displays, and batteries, and to wired I/O 1621 such as that which uses standard hardware and software protocols (e.g., Universal Serial Bus, 1694, or Ethernet). The applications 1635 comprise network applications and a radio access system selection application.

It will be appreciated that by providing harmonized radio system performance values, a preferred radio access system can be determined for a radio device to use with an application package at a particular time and location, thus improving the performance of the radio device and providing a better user experience.

It should be apparent to those of ordinary skill in the art that for the methods described herein other steps may be added or existing steps may be removed, modified, combined, or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "coupled" as used herein is defined as connected, although not necessarily directly and not necessarily mechanically.

Reference throughout this document are made to "one embodiment", "certain embodiments", "an embodiment" or similar terms The appearances of such phrases or in various places throughout this specification are not necessarily all referring to the same embodiment. Furthermore, the particular features, structures, or characteristics attributed to any of the embodiments referred to herein may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method, comprising:
   maintaining a plurality of selection tuples, each comprising an application identifier and additional information comprising a geographic region, a time range, a selection quality set, and a radio system identifier;
   determining, by one or more processing devices, at least one of one of a particular application package and an application genre;
   determining, by the one or more processing devices, use information associated with the use in a radio device of the at least one of the particular application package and a genre application package that is a member of the application genre; and
   selecting, by the one or more processing devices, at least one of a preferred radio system and a preferred application package by using the plurality of selection tuples, wherein the preferred radio system is identified in a selected tuple that includes an application identifier that matches one of the particular application package and the genre application package, and for which the use information correlates with the geographic region and the time range.

2. The method according to claim 1, wherein the use information includes at least one of a use time of the one of the particular application package and the genre application package and a use location of the radio device at the use time.

3. The method according to claim 1, wherein correlation occurs when at least one of (1) the use time is within the time range and (2) the use location is within the geographic region.

4. The method according to claim 1, wherein each selection tuple is obtained from one or more instance tuples that include locations within a common geographic region, acquisition times within a common time range, and common radio system identifiers.

5. The method according to claim 4, wherein obtaining each instance tuple comprises:
   determining an instance quality set of an access system while the access system is used by an application package of one of a plurality of radio devices that does not necessarily include the radio device, wherein the access system comprises a radio system and access network, and wherein the application package has communicated information using a networked service of the access network;
   determining additional information that comprises at least one of a location of the one of the plurality of radio devices and an acquisition time, the instance quality set, and a radio system identifier of the radio system used; and
   transmitting from the one of the plurality of radio devices an application identifier of the application package in association with the additional information.

6. The method according to claim 1, wherein the selection is a selection of a preferred radio system that is made based on one or more of the selection tuples that include an application identifier that matches the particular application identifier, and for which the use information correlates with the geographic region and the time range of the selection tuples, by using the selection quality set of each of the one or more selection tuples.

7. The method according to claim 6, wherein the selection of the preferred radio system is made based further on an energy cost that is determinable from the selection quality sets of the plurality of selection tuples.

8. The method according to claim 1, wherein the selection a selection of a preferred radio system and a preferred application package that is made based on one or more of the selection tuples that include an application identifier that is within an application genre, and for which the use information correlates with the geographic region and the time range of the selection tuples, by using the selection quality set of each of the one or more selection tuples, an wherein the selection is made based further on an energy cost that is determinable from the selection quality sets of the plurality of selection tuples.

9. A radio device, comprising:
   one or more radio transceivers capable of providing radio connections for at least two radio systems; and
   a processing system operatively coupled to the one or more transceivers, wherein the processing system is configured to:
      maintain a plurality of selection tuples, each comprising an application identifier and additional information comprising a geographic region, a time range, a selection quality set, and a radio system identifier;
      determine at least one of one of a particular application package and an application genre;
      determine use information associated with the use in a radio device of the at least one of the particular application package and a genre application package that is a member of the application genre; and
      select at least one of a preferred radio system and a preferred application package by using the plurality of selection tuples, wherein the preferred radio system is identified in a selected tuple that includes an application identifier that matches one of the particular application package and the genre application package, and for which the use information correlates with the geographic region and the time range.

10. The radio device according to claim 9, wherein the use information includes at least one of a use time of the one of the particular application package and the genre application package and a use location of the radio device at the use time.

11. The radio device according to claim 9, wherein correlation occurs when at least one of (1) the use time is within the time range and (2) the use location is within the geographic region.

12. The radio device according to claim 9, wherein each selection tuple is obtained from one or more instance tuples that include locations within a common geographic region, acquisition times within a common time range, and common radio system identifiers.

13. The radio device according to claim 12, wherein obtaining each instance tuple comprises:
   determining an instance quality set of an access system while the access system is used by an application package of one of a plurality of radio devices that does not necessarily include the radio device, wherein the access system comprises a radio system and access network, and wherein the application package has communicated information using a networked service of the access network;
   determining additional information that comprises at least one of a location of the one of the plurality of radio devices and an acquisition time, the instance quality set, and a radio system identifier of the radio system used; and
   transmitting from the one of the plurality of radio devices an application identifier of the application package in association with the additional information.

14. The radio device according to claim 9, wherein the selection is a selection of a preferred radio system that is made based on one or more of the selection tuples that include an application identifier that matches the particular application identifier, and for which the use information correlates with the geographic region and the time range of the selection tuples, by using the selection quality set of each of the one or more selection tuples.

15. The radio device according to claim 14, wherein the selection of the preferred radio system is made based further on an energy cost that is determinable from the selection quality sets of the plurality of selection tuples.

16. The radio device according to claim 1, wherein the selection a selection of a preferred radio system and a preferred application package that is made based on one or more of the selection tuples that include an application identifier that is within an application genre, and for which the use information correlates with the geographic region and the time range of the selection tuples, by using the selection quality set of each of the one or more selection tuples, an wherein the selection is made based further on an energy cost that is determinable from the selection quality sets of the plurality of selection tuples.

17. A non-transitory computer-readable recording medium having instructions stored thereon, the instructions, when executed by one or more processing devices, cause the one or more processing devices to implement a method comprising:
   maintaining a plurality of selection tuples, each comprising an application identifier and additional information comprising a geographic region, a time range, a selection quality set, and a radio system identifier;

determining at least one of one of a particular application package and an application genre;

determining use information associated with the use in a radio device of the at least one of the particular application package and a genre application package that is a member of the application genre; and selecting at least one of a preferred radio system and a preferred application package by using the plurality of selection tuples, wherein the preferred radio system is identified in a selected tuple that includes an application identifier that matches one of the particular application package and the genre application package, and for which the use information correlates with the geographic region and the time range.

18. The non-transitory recording medium according to claim 17, wherein each selection tuple is obtained from one or more instance tuples that include locations within a common geographic region, acquisition times within a common time range, and common radio system identifiers.

19. The non-transitory recording medium according to claim 17, wherein the selection is a selection of a preferred radio system that is made based on one or more of the selection tuples that include an application identifier that matches the particular application identifier, and for which the use information correlates with the geographic region and the time range of the selection tuples, by using the selection quality set of each of the one or more selection tuples.

20. The non-transitory recording medium according to claim 1, wherein the selection a selection of a preferred radio system and a preferred application package that is made based on one or more of the selection tuples that include an application identifier that is within an application genre, and for which the use information correlates with the geographic region and the time range of the selection tuples, by using the selection quality set of each of the one or more selection tuples, an wherein the selection is made based further on an energy cost that is determinable from the selection quality sets of the plurality of selection tuples.

* * * * *